(12) United States Patent
Street et al.

(10) Patent No.: US 8,717,236 B2
(45) Date of Patent: May 6, 2014

(54) POSITION SIGNAL SAMPLING METHOD AND APPARATUS

(75) Inventors: Nicholas Street, London (GB); David Penna, Redhill (GB)

(73) Assignee: U-Blox A.G., Thalwil (CH)

( * ) Notice: Subject to any disclaimer, the term of this patent is extended or adjusted under 35 U.S.C. 154(b) by 299 days.

(21) Appl. No.: 13/140,419

(22) PCT Filed: Dec. 3, 2009

(86) PCT No.: PCT/GB2009/051649
§ 371 (c)(1),
(2), (4) Date: Jul. 14, 2011

(87) PCT Pub. No.: WO2010/073025
PCT Pub. Date: Jul. 1, 2010

(65) Prior Publication Data
US 2011/0260917 A1    Oct. 27, 2011

(30) Foreign Application Priority Data
Dec. 22, 2008 (GB) .................................. 0823329.8

(51) Int. Cl.
*G01S 19/35* (2010.01)

(52) U.S. Cl.
USPC .................................................. 342/357.75

(58) Field of Classification Search
USPC .................................................. 342/357.75
See application file for complete search history.

(56) References Cited

U.S. PATENT DOCUMENTS

| | | | |
|---|---|---|---|
| 6,642,886 B2 | 11/2003 | King | |
| 8,190,807 B2 * | 5/2012 | Reid et al. | 711/3 |
| 2002/0113732 A1 | 8/2002 | King | |
| 2003/0139879 A1 * | 7/2003 | Krasner | 701/213 |
| 2005/0047493 A1 | 3/2005 | Underbrink | |
| 2005/0050293 A1 | 3/2005 | Falk et al. | |

FOREIGN PATENT DOCUMENTS

| | | |
|---|---|---|
| CN | 1873375 | 12/2006 |
| JP | 05-306940 A | 11/1993 |
| JP | 2008-533499 A | 8/2008 |
| WO | WO 03/060542 A2 | 7/2003 |
| WO | WO 2005/047923 | 5/2005 |
| WO | WO 2005/047923 A2 | 5/2005 |
| WO | WO 2006/102033 A1 | 9/2006 |

* cited by examiner

*Primary Examiner* — Harry Liu
(74) *Attorney, Agent, or Firm* — Blakely Sokoloff Taylor & Zafman

(57) ABSTRACT

A method of processing data signals suitable for providing positioning information comprises sequentially recording blocks of data samples of a satellite broadcast from the beginning of a period of time of interest, and storing them in memory. When the memory is full, previously stored blocks of data samples are overwritten, such that the average quantity of sample data decreases, and wherein the memory content includes blocks of data samples covering substantially the full period of time of interest. This method enables blocks of data samples to be kept in memory for a full period of interest (for example a journey) but allows a limited memory capacity. The use of the memory is intelligent and dynamic.

15 Claims, 3 Drawing Sheets

POSITION SIGNAL SAMPLING METHOD AND APPARATUS

This is a non-provisional application claiming the benefit of International Application Number PCT/GB2009/051649 filed Dec. 3, 2009.

This invention relates to the storage of data samples for use in determining the location of an event of interest or for determining the path followed by a device, for example data samples of a satellite positioning system, such as GPS.

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional GPS receiver reads the transmitted data message and saves the ephemeris, almanac and other data for continual use. This information can also be used to set (or correct) the clock within the GPS receiver.

To determine position, a GPS receiver compares the time a signal was transmitted by a satellite with the time it was received by the GPS receiver. The time difference tells the GPS receiver how far away that particular satellite is. By combining distance measurements from multiple satellites, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude. The information received from the satellites can also be used to set (or correct) the clock within the GPS receiver.

By processing the apparent Doppler shifts of the signals from the satellites, a GPS receiver can also accurately provide speed and direction of travel (referred to as 'ground speed' and 'ground track').

Nearly all current GPS receivers work by processing signals from the satellites in "real time", as they come in, reporting the position of the device at the current time. Such "conventional" GPS receivers invariably comprise:
- an antenna suitable for receiving the GPS signals,
- analogue RF circuitry (often called a GPS front end) designed to amplify, filter, and mix down to an intermediate frequency (IF) the desired signals so they can be passed through an appropriate analogue-to-digital (A/D) convertor at a sample rate normally of the order of a few MHz,
- digital signal processing hardware that carries out the correlation process on the IF data samples generated by the A/D converter, normally combined with some form of micro controller that carries out the "higher level" processing necessary to control the signal processing hardware and calculate the desired position fixes.

The less well known concept of "Capture and Process Later" has also been investigated. This involves storing the IF data samples collected by a conventional antenna and analogue RF circuitry in some form of memory before processing them at some later time (seconds, minutes, hours or even days) and often at some other location, where processing resources are greater.

The key advantages of the Capture and Process Later approach over conventional GPS receivers are that the cost and power consumption of the capturing device are kept to a minimum as no digital signal processing needs be done at the time of capture, and the captures can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

One problem with GPS systems is that at times the GPS environment may be difficult, for example indoors or in an "urban canyon" between high rise buildings, so that it may not be possible to do a location fix using GPS. The sensitivity of GPS can be improved which can help this problem, but does not solve it completely, as there will always be situations in which there are insufficient satellite signals. Increased sensitivity also increases power consumption and cost, due to the extra computation and processing performed.

Tracking solutions provide a way forward, as a position found outdoors can then be tracked into and through difficult environments. The sensitivity can be substantially improved by this means, often giving good performance. The "last known position" can also be reported. However a tracking system consumes power consumption continually, even if actually the results are not used—the track must be maintained in case it is required later.

An alternative approach is to take advantage of the low power usage of a capture and process later approach, and to store samples for processing later. However, the storage of samples will use, and eventually fill, the available memory capacity. It may not be possible or desirable to provide sufficient memory to store all the desired captures for a given operating period. It may also not be possible to predict how frequently captures can be taken to avoid the available memory becoming full, if the duration of operation is unknown (for example if the positioning system is to be used for a journey of unknown exact duration).

If the memory becomes full, it is possible to stop collecting data captures, but this will mean that the latest data is not obtained. Alternatively, the memory can be operated in a circular (FIFO) manner, so that the most recent data is kept.

Neither of these options provides an optimum way of operating with a memory of limited capacity.

According to an aspect of the current invention, there is provided a method of processing data signals suitable for providing positioning information, the method comprising:

sequentially recording blocks of data samples of a satellite broadcast from the beginning of a period of time of interest, and storing them in memory;

in response to the memory becoming full of sequence elements, continuing sequentially to record the blocks of data samples, and overwriting previously stored blocks of data samples, such that the average quantity of sample data decreases, and wherein the memory content includes blocks of samples covering substantially the full period of time of interest.

This method enables samples to be kept in memory for a full period of interest (for example a journey) but allows a limited memory capacity. The use of the memory is intelligent and dynamic.

This method avoids the need to predict the length of the period of time of interest. Thus, there is no need to plan the sampling rate in an attempt to arrange for the memory to fill just as the period of interest ends.

The method enables the memory information to provide a full route information with as much accuracy as possible for a given memory resource.

The average quantity of sample data preferably decreases per sequence element, more particularly per sequence element as defined during the initial memory filling. By this is meant the amount of data within a period of time corresponding to the time between elements of the initial sequence, i.e. between captures when the memory is filled initially.

In one example, the sequence used to fill the memory can be periodic, i.e. a capture every fixed time period. In this case, each sequence element is associated with the same duration time period, and the average quantity of sample data per sequence element is equivalent to the amount of memory resource allocated per unit time. Thus, the average is with respect to time.

In another arrangement, the sequence can comprise variable time between sequence elements. For example there may be constant distance between captures, for example a capture every given number of wheel revolutions. In this case, each sequence element is associated with a different time period between captures. The average quantity of sample data per sequence element is then equivalent to the amount of memory resource allocated per unit distance, e.g. per given number of wheel revolutions. Thus, the average is with respect to distance, although it is noted that there will also be a decrease in density with respect to time.

Thus, the sequence may have fixed time period between captures while the memory is filling or it may have variable time period, and this variable time period may arise for other reasons than for captures per unit distance.

This average quantity of sample data can be decreased over time in two main ways.

A first approach is to arrange the overwriting such that the average time period between adjacent time-sequential stored blocks of data samples increases. For example, there may have been captures at time instants t, t+1 and t+2 (1 capture per unit time). By overwriting the capture for time instant t+1, captures t and t+2 are now adjacent time-sequential captures, and the interval has increased to from 1 to 2. The same approach can apply to the sequence elements which are not separated by constant time.

In the case of a periodic sequence, this corresponds to a drop in capture data per unit time to 0.5 captures per unit time. Thus, there is a set of captures that covers the full period of time of interest, but with progressively more widely spaced retained captures.

A second approach is to arrange the overwriting such that the average quantity of sample data for a given sequence recording (i.e. capture) decreases. For example 200 ms blocks of data samples may be stored at time t, t+1, t+2. Half of the memory occupied by capture t+1 may be overwritten with 100 ms of data relating to a different time instant, so that progressively all the captures are of 100 ms duration. This will have halved the volume of sample data per sequence element.

In either case, a full history trail is available (in contrast to the more simple use of a circular memory).

The period with which blocks of data samples are periodically recorded can increase with time, particularly for the first approach outlined above.

It is possible for the data captures to be overwritten in such a way that the data captures in memory are more densely populated in relatively recent time than in relatively ancient time.

This approach is of interest for applications where the device can perform position fix calculations. In this case, an irregular capture pattern is defined in the memory, with more captures near the time at which a position fix is requested. Thus, there is more information in memory relating to the recent history before the desired position fix.

In this case, a most recent block of data samples can be processed in an attempt to obtain a position fix, in response to a request for a position determination at a particular time during the period of time of interest.

If the attempt to obtain a position fix is unsuccessful, the method can further comprise processing blocks of data samples which were recorded further back in time in a sequence to make further attempts to obtain a position fix, until a position fix is obtained.

This provides a positioning method in addition to normal satellite reception capability, and provides the capture and store of a log of blocks of samples at other times. If the requested position fix is not successful then recent blocks of samples are used to establish a last known position.

The method can further comprise recording additional blocks of data samples of the satellite broadcast in response to the request for a position determination, thereby forming the most recent block of data samples. This means a block of samples is taken as close to the desired timing as possible.

After obtaining a position fix, re-attempts can be made for the unsuccessful attempts using the additional information of the successful attempt. This can enable a position fix to be obtained where it was previously not possible.

Position fixes can be obtained for times before the obtained position fix, thereby to form a position trail. This can cover the full period of interest.

The recording and the processing can take place on a portable battery operated device. For example this may be a tracking device to be provided with a container during shipment, so that a history of the location can be obtained, and a request for a current location can be answered.

Instead of having recent captures more densely populated, the data captures can be overwritten in such a way that the data captures in memory tend towards being substantially evenly populated (with respect to time or distance) for the full period of time of interest. This may be appropriate for a logging device, which provides a trail history but does not provide real time position information. In this case, the recording takes place on a portable battery operated device (the logger) and the processing takes place on a separate device onto which data from the portable device is downloaded after the period of time of interest.

In all cases, the samples can comprise intermediate frequency downconverted data samples.

The invention can be implemented as a computer program.

The invention also provides apparatus for processing data signals suitable for providing positioning information, the apparatus comprising:

a memory;

first receiving means, adapted to sequentially record blocks of data samples of a satellite broadcast from the beginning of a period of time of interest;

a processor for controlling the storage of the blocks of data samples in the memory;

wherein the processor is adapted:

in response to the memory becoming full of sequence elements, to continue to sequentially record the blocks of data samples, and overwrite previously stored blocks of data samples, such that the average quantity of sample data decreases, wherein the memory content includes blocks of data samples covering substantially the full period of time of interest.

The apparatus can further comprising a processing means for processing a most recent block of data samples in an attempt to obtain a position fix, in response to a request for a position determination at a particular time during the period of time of interest.

The invention will now be described by way of example with reference to the accompanying drawings, in which.

The invention provides a method of processing data signals suitable for providing positioning information, in which a limited capacity memory is used to store blocks of data samples. The memory is intelligently overwritten such that the average quantity of sample data per capture decreases, but the memory content includes samples covering substantially the full period of time of interest. By this is meant that the memory enables a trail of data to be recovered for the full time duration. If the captures end up being spaced every 10 minutes (as a random example), there may be no captures for the first 10 minutes of a journey. However, substantially the full journey can nevertheless be considered to be represented by the data in memory. Thus, preferably, the first capture is for a time period which is at most a time after the start of the time period of interest which is equal to the greatest time between the other captures in memory. Substantially the full time period may instead be considered to be at least 90% or more preferably 95% of the time period of interest.

The invention can be used in full function GPS receivers or in capture and process later applications. However, in each case, the device implements a form of capture and process later functionality, in that data captures are stored in memory for future use in obtaining a position fix.

In a typical capture and process later application, a small capture device which stores short "captures" of IF data samples into memory can subsequently upload its IF data captures to a shared central computer which would not only carry out the necessary signal processing (correlation etc), but would also have access to a database of recent satellite information (ephemeris etc) by being connected to one or more conventional GPS receivers which relayed key parts of the GPS data message they received to the central computer.

Figure 1:
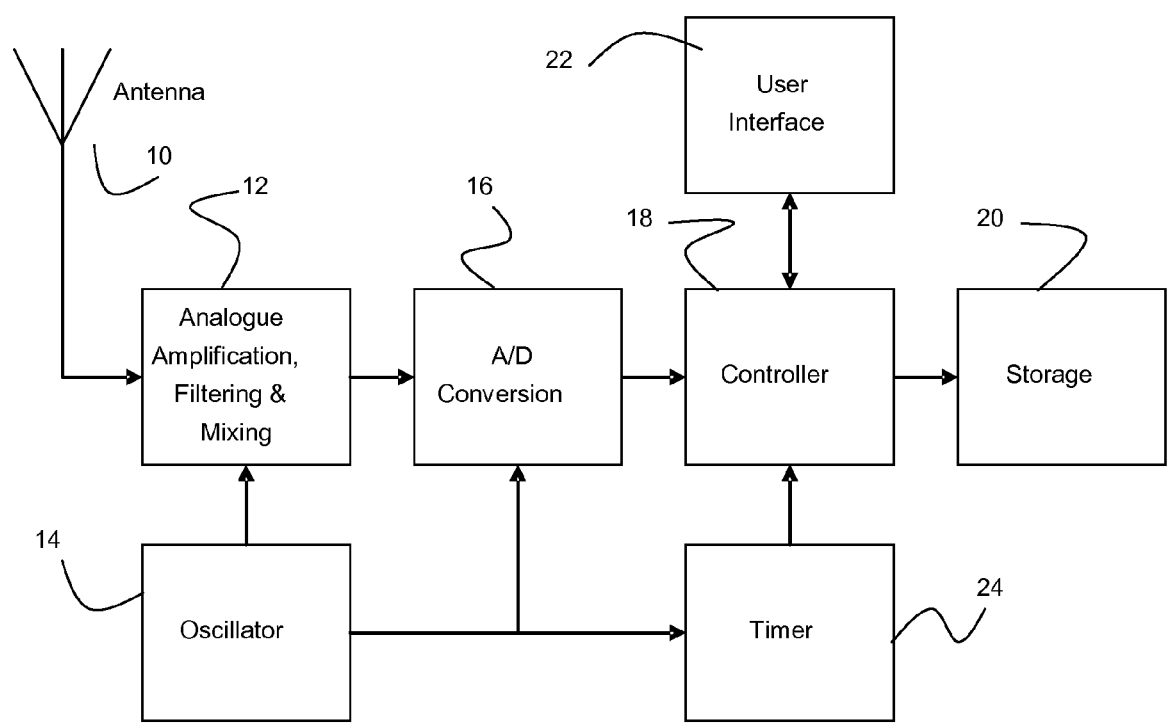
FIG. 1 shows a GPS receiver suitable for Capture and Process Later operation and which can be used to implement the invention.

FIG. 1 is a system diagram of a Capture and Process Later GPS system. The signals from the GPS satellites are received by the antenna 10 and then put through conventional analogue processing, typically comprising a combination of amplification, filtering and down mixing in unit 12 driven by a reference oscillator 14 (normally a temperature compensated crystal), followed by A/D conversion in unit 16. This is the conventional radio receiver electronics forming the RF front end.

A controller 18, implemented as discrete logic or a micro processor with associated firmware, selects portions of the sampled IF data generated by the RF front end to be stored in the storage device 20, for example a flash RAM, hard disc etc. The manner in which it does this is influenced by settings from the user (as input by the GUI 22) and the use of a timer 24 which can also be driven by the oscillator 14 as shown.

This invention relates particularly to applications in which the capacity of the memory 20 is insufficient to record captures for a full expected period of use of the device, so that memory overwriting is required.

The timer 24 can be as simple as a counter driven by the oscillator, or it could be a real-time clock (RTC) which keeps date and time even when the device is otherwise turned off. It may have a separate oscillator to minimise "off" energy usage.

When activated, the device records short blocks of IF data from the RF front end (these short blocks are termed "captures" in the following description) along with an associated timestamp from the timer 24. These captures may be for example 100 ms long and they could be recorded at regular intervals, for example once every 10 s. Typically, the RF front end provides a stream of samples at a rate of 6 MHz, and a capture comprises the 100 ms (or 200 ms for example) data of that stream (i.e. 0.6 or 1.2 million samples). The exact values used could be varied explicitly or implicitly by the user via the GUI 22. In different applications, different length captures will be appropriate. Typically, each capture will be shorter than the subframe duration of 6 s, and preferably less than 500 ms.

Preferably, energy consumption in the periods between captures is minimized by turning off as many components of the GPS receiver as possible. A minimal set of components, including the timer 24, remain active, in order to "wake" the receiver at the time of the next capture. The device can thus be implemented as a battery operated portable device, and the battery life can therefore be extended.

In a purely capture and process application, any position determination is obtained by connecting the device to a computer to upload the recorded data samples. In an application in which the device is provided with full GPS functionality, the system also includes the required processing capability to obtain a position fix from the samples, either recorded or in real time.

This invention relates to a system in which a log of captures (by "capture" is meant a recorded block of GPS IF samples) of position-related information are received and stored in case they are of use later to contribute the estimation of a position fix. Thus, additional captures are used to those which are obtained at the time of the desired position fix.

The additional captures are spread over the entire duration of the "period of time of interest", by which is meant the time period for which a position fix may subsequently be desired. The period of interest will be a journey in the case of a data logger or tracker. The density of data decreases over time.

In one example, the captures can be received and stored at regular intervals, although this is not essential as will be explained below. The interval will depend on the application, in particular the expected speed at which the device is moving, and the required accuracy of the position. For example, for tracking the delivery of goods over a long road journey, periodically sampling every 5 minutes will be adequate, to know where the consignment is. For tracking the path followed by a motorcycle around a course, a capture every second may be more appropriate. The captures are stored, together with an indication of the time at which they were received.

The memory 20 has a capacity which is insufficient to record captures at the optimum rate for all possible durations of use of the device, and the invention provides various memory overwriting schemes.

Figure 2:
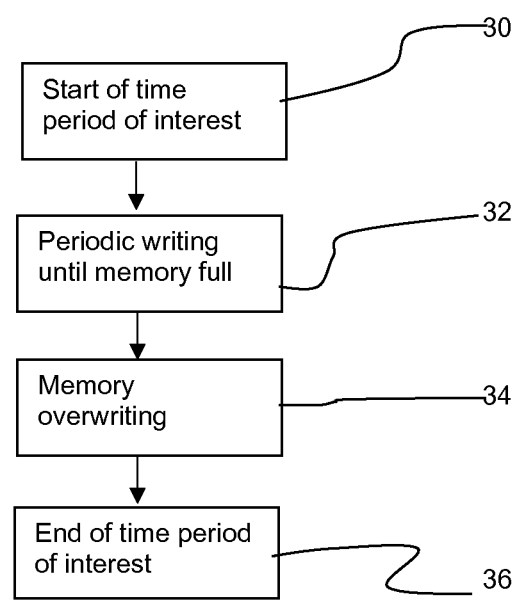
FIG. 2 shows a first example of method of the invention.

FIG. 2 is used to explain the method of the invention.

Step 30 represents the beginning of the time period of interest, for example a journey. In step 32, the receiver records blocks of data samples of a satellite broadcast from the beginning of a period of time of interest, and stores them in the memory as a sequence of captures. If the recording takes place at regular time intervals, the captures are spaced by uniform amount of time (i.e. each capture relates to a fixed amount of time), but the recording can take place in other ways, for example at fixed units of distance movement (i.e. each sequence element relates to a fixed amount of distance).

When the memory becomes full, the overwriting step 34 continues to sequentially record the blocks of data samples, but overwrites previously stored blocks of data samples.

This overwriting is not in the manner of a circular buffer, but instead maintains captures covering the full period of time of interest. However, the average quantity of sample data per sequence element of the period of time of interest decreases. The end of the time period of interest is shown as step 36.

The overwriting can be arranged such that the average time period between time-adjacent stored blocks of data samples increases or such that the average quantity of sample data for a given capture decreases. By "time-adjacent blocks of data samples" means blocks of data sample (i.e. captures) taken at two time points, when there are no other captures in the memory for times between those two time points. The spacing between sequence elements at which blocks of data samples are recorded can increase with time, because the captures become progressively further apart in time (or distance) as the time period lengthens.

In one arrangement, the captures remain substantially uniformly distributed over time (i.e. the memory contains a capture every t seconds). Of course the overwriting will give rise to some irregularity, but the overwriting scheme can be designed to tend towards this uniformity. However, an alternative is that an irregular pattern of captures may be retained, for example with frequent recent captures, but most of the older captures discarded to free memory capacity, while retaining a few old captures to give a coarser picture of historical movements, with less reliability.

The captures are however, in each case, spread over the period of time for which the device is active, with progressive thinning out of the captures stored. So for example, for tracking during a time period of several days and using the time-periodic recording:

the first day may be stored with 1 capture every 5 minutes, then the second day overwrites the even captures, so that at the end of the second day the memory contains 1 capture every 10 minutes, then the third and fourth days overwrite half the captures stored for the first and second days so that at the end of the fourth day the memory contains 1 capture every 20 minutes, etc.

As a result, at any particular time, the interval between retained captures so far stored varies through the trail. At a later time, when the trail is longer, the intervals and variation will be different.

The captures in memory are used for GPS fixes. This may be in a real time device, following a request for calculation of the position (together with information such as satellite ephemeris assistance information). Alternatively, in a capture and process later device, the position fix may be after the data has been uploaded from the device for processing the position fixes on a connected PC.

Two examples of possible use of such a system are discussed below:

(i) A Cellular Tracking Device

The device receives GPS signals and stores captures every 5 minutes (without processing them). Once the memory is full, the captures are sequentially overwritten in an intelligent manner. The device has cellular telephony capability, so that it can receive a remote request for a position fix. The cellular network provides the tracking device with the required current and historical satellite information, and requests the position fix.

The device can then (optionally) take a fresh GPS capture, so that there is data as close as possible to the timing of the desired position fix. An attempt is then made to calculate position using the current and recent position fixes. The previous historical position fixes can then also be calculated, to obtain a trail of the movement of the device. The trail is reported to the cellular network.

In this example, it may be more important to provide an accurate individual position rather than a uniformly accurate historical trail. Thus, the memory overwriting can be chosen to favour recent captures, in the exception of a possible position request.

Thus, the captures kept in memory can follow a desired pattern leading up to the current point in time. By way of example, a set of captures may be maintained at spaced intervals back from the current point in time, for example:

Every 5 minutes for the last two hours;
Every hour for the preceding day;
Every 6 hours for the preceding week, etc.

If a GPS fix request is not received then the overwriting progresses in the default way (explained above) with progressive thinning of the data density with respect to time.

It can be seen in this example that the captures which are kept are more densely populated in relatively recent time than in relatively ancient time. There may be as few as two different rules—so that there is one period of high density of captures, and the remainder of time has the same lower density of periodic captures—and which diminishes as the memory is progressively further overwritten.

(ii) A Logger

This device receives and stores position captures, for example every 5 minutes or every 20 metres. It is not able to receive real time requests for position, and is used simply for historical tracking. In this case, the data density (per unit time or distance) can be kept uniform for the full time period of interest.

At the end of the journey, the captures are uploaded to a PC connected to a service, which processes the captures and produces a fix trail. For a logging device being used to store multiple tracks, the memory re-usage system may be applied just to the current track.

An example simple algorithm will now be explained, which uses just 9 memory slots for the purposes of explanation. This example is based on the data overwriting using fixed lengths of capture (e.g. 100 ms or 200 ms) rather than thinning the data quantity for a given sampling instant, and based on capture at regular time intervals.

The method provides writing of data in rounds. In the first round, data is written to fill the memory, at the first default capture period. For ease of explanation, a capture period of 1 s is used (but any other value could be employed). Consequently at the end of the first round nine captures will have been made, at intervals of 1 s.

In all subsequent rounds, half of the memory slots are overwritten, which in this case means 4 slots (4 being half of 9, when fractions are rounded down). However for each round the capture period is doubled each time (so 2 s for the second round, 4 s for the third round, 8 s for the fourth round and so on). The slots that are overwritten are those which contain a capture from a time that is not a multiple of this round's capture period.

The process is illustrated below, in which a data block Zn indicates data written in round name Z at time t=n seconds:

First Round A:

1 sec capture period, all slots to be filled

| Slot: | | | | | | | | |
|---|---|---|---|---|---|---|---|---|
| 0 | 1 | 2 | 3 | 4 | 5 | 6 | 7 | 8 |
| A0 | A1 | A2 | A3 | A4 | A5 | A6 | A7 | A8 |

Second Round B 2 sec capture period, half of the slots to be filled

| Slot: | | | | | | | | |
|---|---|---|---|---|---|---|---|---|
| 0 | 1 | 2 | 3 | 4 | 5 | 6 | 7 | 8 |
| A0 | B10 | A2 | B12 | A4 | B14 | A6 | B16 | A8 |

Captures B10, B12, B14, B16 are written, overwriting A1, A3, A5 and A7 (as 1, 3, 5, and 7 are not multiples of 2).

Third Round C 4 sec capture period, half of the slots to be filled

| Slot: | | | | | | | | |
|---|---|---|---|---|---|---|---|---|
| 0 | 1 | 2 | 3 | 4 | 5 | 6 | 7 | 8 |
| A0 | C20 | C24 | B12 | A4 | C28 | C32 | B16 | A8 |

Captures C20, C24, C28, C32 are written, overwriting B10, A2, B14 and A6 (as 10, 2, 14 and 6 are not multiples of 4).

Fourth Round D 8 sec capture period, half of the slots to be filled

| Slot: | | | | | | | | |
|---|---|---|---|---|---|---|---|---|
| 0 | 1 | 2 | 3 | 4 | 5 | 6 | 7 | 8 |
| A0 | D40 | C24 | D48 | D56 | D64 | C32 | B16 | A8 |

Captures D40, D48, D56, D64 are written, overwriting C20, B12, A4 and C28 (as 20, 12, 4 and 28 are not multiples of 8).

Fifth Round E 16 sec capture period, half of the slots to be filled

| Slot: | | | | | | | | |
|---|---|---|---|---|---|---|---|---|
| 0 | 1 | 2 | 3 | 4 | 5 | 6 | 7 | 8 |
| A0 | E80 | E96 | D48 | E112 | C32 | E96 | B16 | E80 |

Captures E80, E96, E112, E128 are written, overwriting D40, C24, D56 and A8 (as 40, 24, 56 and 8 are not multiples of 16).

This example is simply to show that the memory overwriting function can be automated in a simple manner.

The captures are preferably annotated by a time stamp, but various other attributes can be recorded along with the IF data captures, including:

(i) Date & time (in a known time system)

(ii) Identifier for, or values of, the RF front end characteristics (such as sample rate, centre frequency, oscillator type/attributes etc.)

(iii) Data format (endianess of data, ordering of bits when there is more than 1 bit per sample, complex/real notation)

(iv) Identifiers for device model (or even a unique device ID)

The example above performs the memory allocation without any input from external devices, and is suitable for the logger application. The memory allocation can be enhanced to allow for real-time position requests and improve the position fixes obtained.

Figure 3:
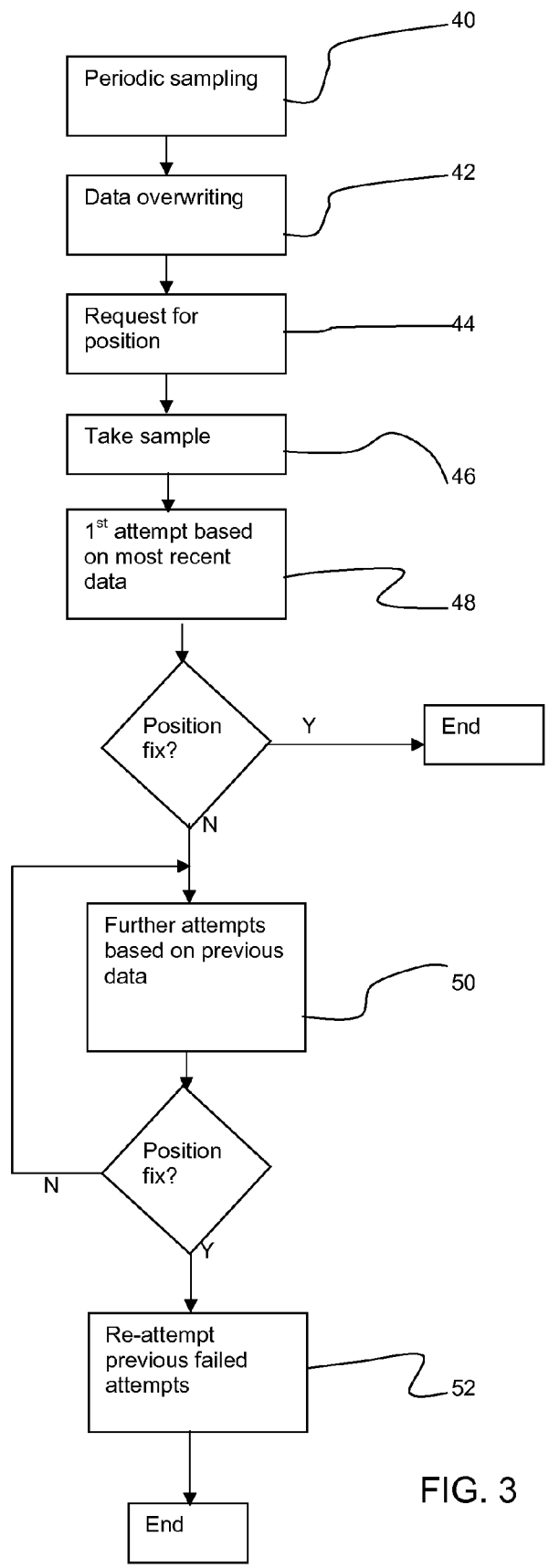
FIG. 3 shows a second example of method of the invention.

FIG. 3 is a flowchart showing how this approach is used to obtain a position fix in an example of the invention in which the device has full GPS functionality, such as the tracking example given above. This combines the reduction in density of data per unit time, as explained in detail above, with an irregular allocation of memory capability so that relatively more data is available near the desired time of a position fix.

In step 40, there is periodic sampling of blocks of IF GPS samples, for example of 200 ms duration and 1 s interval (as an arbitrary example). The memory capacity is not adequate to store all captures for a given period of operation, so there is data overwriting explained above in step 42.

In step 44 there is a request for position. This can optionally give rise to a further GPS sampling shown in step 46 so that one GPS capture is at the correct time. Alternatively, the most recent capture can instead be used.

In step 48, a position fix is attempted by the device based on the most recent capture. A-GPS information (satellite "ephemeris") may be provided by the system to enable the position fix attempt based on historical GPS samples. If this first attempt is successful, the method ends (and returns to periodic sampling and overwriting). If this first attempt is not successful, there are further attempts using the previous data, and following a sequence backwards in time. Each further attempt is represented by block 50, and an iterative process is followed until the position fix is obtained. This will be possible once a point in time has been reached when the satellites were found, for example because the user was then outdoors at that time.

The irregular timing of captures used means that repeated attempts are not made when it is unlikely that they will be successful. For example, if a position fix is not possible now, 5 s ago, or 10 s ago, it is unlikely that a position fix was possible 15 s ago. Instead, the next captures may be at 1 m ago, 2 m ago etc.

There is then an optional step 52 of re-attempting the previously failed position fixes using additional information which has become available from the successful position fix (i.e. the knowledge of the approximate location and time, which can for example enable the satellites in view to be determined). This may even result in a position fix for the current, requested GPS fix capture which had previously failed.

The process ends and returns to the periodic sampling after the processing has been completed.

A history of movement is also desired in the applications outlined above in addition to the position at the time of the request. Thus, further previous captures are processed to show a trail of the history of position, prior to the position request.

The principles above can be applied to any GPS device, including dedicated GPS/GSM tracking devices, GPS phones, cameras, video cameras.

The processing required to obtain a position fix based on GPS samples is conventional. It essentially involves a search of the IF samples for the signals of as many SVs as possible, followed by estimation of the time of flight of those signals and trilateration to derive a position. At this stage, the downloaded ephemeris data can be used to guide the search. For example, knowing the request time and the positions over time of each SV, only certain SVs would be visible to a receiver in a given position. Thus, once a signal corresponding one of the SVs is found, a number of other SVs which could not simultaneously be visible can be eliminated from the search.

As mentioned above, the sequence of recorded captures can initially be uniformly spaced in time or in distance. Thus, a "sequence element" is the part of the sequence which is allocated to a particular capture, and this can be a constant length of time (e.g. the first 10 s corresponds to the first "sequence element") or it can be a constant distance (e.g. the first 10 metres corresponds to the first "sequence element"). The thinning of data applies in the same way to both scenarios, for example:

to increase the spacing between sequence elements (e.g. so that there is 20 s between stored captures or 20 metres), or to reduce the data per sequence element (e.g. there is 100 ms data for the first 10 s instead of 200 ms, or there is 100 ms for first 10 metres instead of 200 ms).

More generally, the sequence of captures can be controlled by any suitable trigger. The two examples above relate to a trigger in the form of a clock or a distance measurement arrangement, but other external triggers are possible, for example providing a capture every time the user enters a different position zone (so that the captures record movement between zones rather than movement within zones). The captures may also be controlled based on signal strength measurements so that the captures provide the best chances of obtaining a position fix. Thus, there are many possible ways to fill the memory initially with elements of a sequence, and the invention can be applied to all of these when overwriting the memory content.

There are additional possibilities of combining the captured GPS measurements with cellular information (base stations, frequency measurement, timing advance), as part of the processing to obtain position fix.

Additional inputs can be used to control the way memory is allocated. For example, an indication of the battery level may be used to control the sampling period, so as to conserve battery power when this is needed.

The two examples of full function GPS (with ephemeris assistance) or a capture and process implementation (with IF data uploaded for processing) have been described, but there can be implementations between these two extremes. An example is a so-called Assisted-GPS solution that processes as far as pseudo-ranges and then uploads them to a server which has the ephemeris and can perform the position fix.

In all the different forms outlined above, the method requires very little power consumption, as only the GPS signal samples are captured, and normally these are not processed. The GPS radio needs to be turned on, to receive the GPS signal—but this is much less than the energy that would be needed to carry out the signal processing in order to recover and measure the GPS signals themselves, and hence calculate a position fix. Importantly, processing energy is only consumed if a position fix is requested.

The invention has been described in connection with (single frequency) GPS, but other GNSS systems (GLONASS, Galileo etc) would be similar. Indeed the techniques could also be applied to multiple frequency systems.

Only one schematic outline of the system configuration has been given. It will be appreciated by those skilled in the art that the invention can be implemented simply as a change in the data which is kept in memory (in the case of a memory overwriting version) or as a change in the selection of data to be processed. Each of these changes in functionality can be implemented with completely standard hardware, and with changes in software which will be routine. Thus, the system configuration has not been described in detail and many different versions are possible.

Various other modifications will be apparent to those skilled in the art.

The invention claimed is:

1. A method of processing data signals suitable for providing positioning information, the method comprising:
   sequentially recording blocks of data samples of a satellite broadcast from the beginning of a period of time of interest and storing them in memory;
   in response to the memory becoming full, continuing sequentially to record the blocks of data samples, and overwriting previously stored blocks of data samples, such that the average quantity of sample data decreases, and wherein the memory content includes blocks of samples covering substantially the full period of time of interest.

2. The method of claim 1, wherein the overwriting is such that the average time period between time-sequential stored blocks of data samples increases.

3. The method of claim 1, wherein the overwriting is such that the average quantity of sample data for a given sequence recording decreases.

4. A method as claimed in claim 1, wherein the spacing between sequence recordings at which blocks of data samples are sequentially recorded increases with time.

5. A method as claimed in claim 1, wherein the blocks of data samples are overwritten in such a way that the average quantity of sample data is greater in relatively recent time than in relatively ancient time.

6. A method as claimed in claim 5, further comprising:
in response to a request for a position determination at a particular time during the period of time of interest, processing a most recent block of data samples in an attempt to obtain a position fix.

7. A method as claimed in claim 6, wherein if the attempt to obtain a position fix is unsuccessful, the method further comprises processing blocks of data samples which were recorded further back in time in a sequence to make further attempts to obtain a position fix, until a position fix is obtained.

8. The method of claim 7, further comprising recording additional blocks of data samples of the satellite broadcast in response to the request for a position determination, thereby forming the most recent block of data samples.

9. The method of claim 7, wherein after obtaining a position fix, re-attempts are made for the unsuccessful attempts using the additional information of the successful attempt.

10. The method of claim 7, further comprising obtaining position fixes for times before the obtained position fix, thereby to form a position trail.

11. The method of claim 6, wherein the recording and the processing take place on a portable battery operated device.

12. The method of claim 1, wherein the blocks of data samples are overwritten in such a way that the blocks of data samples in memory tend towards having a uniform quantity of sample data for the full period of time of interest.

13. The method of claim 12, wherein the recording takes place on a portable battery operated device and the processing takes place on a separate device onto which data from the portable device is downloaded after the period of time of interest.

14. The method of claim 1, wherein the samples comprise intermediate frequency downconverted data samples.

15. Apparatus for processing data signals suitable for providing positioning information, the apparatus comprising:
a memory;
first receiving means, adapted to sequentially record blocks of data samples of a satellite broadcast from the beginning of a period of time of interest;
a processor for controlling the storage of the blocks of data samples in the memory,
wherein the processor is adapted:
in response to the memory becoming full of sequence elements, to continue to sequentially record the blocks of data samples, and overwrite previously stored blocks of data samples, such that the average quantity of sample data decreases,
wherein the memory content includes blocks of data samples covering substantially the full period of time of interest.

* * * * *